(12) United States Patent
Oh

(10) Patent No.: US 7,677,132 B2
(45) Date of Patent: Mar. 16, 2010

(54) TILT AND TELESCOPIC STEERING SYSTEM

(75) Inventor: Jae Moon Oh, Wonju-si (KR)

(73) Assignee: Mando Corporation, Pyeongtaek-si (KR)

( * ) Notice: Subject to any disclaimer, the term of this patent is extended or adjusted under 35 U.S.C. 154(b) by 275 days.

(21) Appl. No.: 11/805,580

(22) Filed: May 23, 2007

(65) Prior Publication Data
US 2007/0295143 A1 Dec. 27, 2007

(30) Foreign Application Priority Data
Jun. 7, 2006 (KR) .................. 10-2006-0050827

(51) Int. Cl.
*B62D 1/18* (2006.01)
(52) U.S. Cl. ................................ 74/493; 280/775
(58) Field of Classification Search ............ 74/492, 74/493; 280/775
See application file for complete search history.

(56) References Cited
U.S. PATENT DOCUMENTS

| | | | | |
|---|---|---|---|---|
| 4,317,387 A | * | 3/1982 | Myers et al. | ............... 74/493 |
| 5,199,319 A | * | 4/1993 | Fujiu | ..................... 74/493 |
| 5,595,399 A | * | 1/1997 | Fouquet et al. | ............ 280/777 |
| 5,596,907 A | * | 1/1997 | Barton | ..................... 74/493 |
| 5,655,413 A | * | 8/1997 | Barton | ..................... 74/493 |
| 6,860,669 B2 | * | 3/2005 | Laisement et al. | ..... 403/109.1 |
| 2005/0160863 A1 | * | 7/2005 | Matsumiya | ............... 74/492 |

* cited by examiner

*Primary Examiner*—Thomas R Hannon
*Assistant Examiner*—Justin Krause
(74) *Attorney, Agent, or Firm*—Lahive & Cockfield, LLP; EuiHoon Lee, Esq.

(57) ABSTRACT

Disclosed is a tilt-and-telescopic steering system having a guide bush, the system including an interior tube and an exterior tube which surround a steering shaft; a distance member integrally fixed to an outer peripheral surface of the exterior tube; tilt brackets assembled with an outer peripheral surface of the distance member so as to limit a movement angle in tilt operation; and a lever and a bolt which hold and release the tilt-and-telescopic system, wherein a through hole is formed in the exterior tube and the distance member which are disposed between an outer peripheral surface of the interior tube and an inner peripheral surface of the tilt brackets, wherein a guide bush is inserted in the through hole.

4 Claims, 4 Drawing Sheets

TILT AND TELESCOPIC STEERING SYSTEM

RELATED APPLICATION

This application claims convention priority to Korean patent application No. 2006-50827 filed on Jun. 7, 2006, the content of which is incorporated by reference.

FIELD OF THE INVENTION

The present invention relates to a tilt-and-telescopic steering system, and more particularly to a tilt-and-telescopic system including a guide bush, which is inserted through an exterior tube and a distance member and simultaneously holds the exterior tube and an interior tube, thereby increasing the fixing strength of the exterior tube and the interior tube when a lever is operated.

BACKGROUND OF THE INVENTION

In general, a vehicular steering column is installed in front of a driver's seat so that a rotational force of a steering wheel is transferred to a vehicle via a gear box. The vehicular steering column includes a tilt-and-telescopic system for controlling a location of a steering wheel depending on a physical condition of the driver.

In order to secure a tilt function for controlling a fixed angle of the steering wheel, the telescopic apparatus has two hollow pipes including one pipe inserted in the other pipe, so that they can extend and retract in an axial direction.

FIG. 1 is a perspective view of a conventional steering column. The conventional steering column 100 includes a distance member 120, an exterior tube 130, an interior tube 140, a bush 150, an upper mounting bracket 160, and a lower mounting bracket 170.

The tilt apparatus is a mechanism for changing an angle of the steering wheel (not shown) by operating a lever 180. The tilt operation can be easily performed due to a tilt spring 110. The tilt spring 110 prevents the steering wheel from rapidly moving toward a lower direction due to gravity, and enables the driver to easily shift the steering wheel in an upper direction.

The distance member 120 is a mechanism for enabling the steering column 100 to extend and retract by the operation of the lever 180. The distance member 120 includes the exterior tube 130 which is hollow and allows the interior tube 140 to slide therein and the interior tube 140 inserted in the exterior tube 130 and sliding therein.

Meanwhile, when the interior tube 140 slides in the axial direction thereof so as to control a displacement of the steering column, the bush 150 is inserted between an outer peripheral surface of the interior tube 140 and an inner peripheral surface of the exterior rube 130 in order to allowing the smooth sliding of the interior tube 140.

Meanwhile, it is a recent tendency that an engine is set to have a low RPM (Revolution Per Minute) during idling of the vehicle, in order to improve fuel efficiency thereof. As the RPM of the idling decreases, the vibration of the engine shows a tendency to increase. However, such a problem can be remarkably lessened, because an engine mount of a rubber material, which fixes the engine in a vehicular body, absorbs a certain amount of vibration. However, in view of the steering system, it is necessary to increase the strength of the bush 150 so as to prevent the resonance of the steering system, which occurs at the low RPM while idling, and so as to keep a determined telescopic force when the lever 180 is held and released. Therefore, there are many problems in that the strength of the bush 150 increases under the structure that the bush 150 is inserted between the interior tube 140 and the exterior tube 130.

SUMMARY OF THE INVENTION

Accordingly, the present invention has been made to solve the above-mentioned problems occurring in the prior art, and an object of the present invention is to provide a tilt-and-telescopic system including a guide bush, which is inserted through a exterior tube and a distance member and simultaneously holds the exterior tube and an interior tube, thereby increasing the fixing strength of the exterior tube and the interior tube when a lever is operated.

In accordance with an aspect of the present invention, there is provided a tilt-and-telescopic steering system including; an interior tube and an exterior tube enclosing a steering shaft; a distance member integrally fixed to an outer peripheral surface of the exterior tube; tilt brackets assembled with an outer peripheral surface of the distance member so as to limit a movement angle in tilt operation; and a lever and a bolt which fix and release the tilt-and-telescopic system, wherein a through hole is formed in the exterior tube and the distance member which are disposed between an outer peripheral surface of the interior tube and an inner peripheral surface of the tilt brackets, wherein a guide bush is inserted in the through hole.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
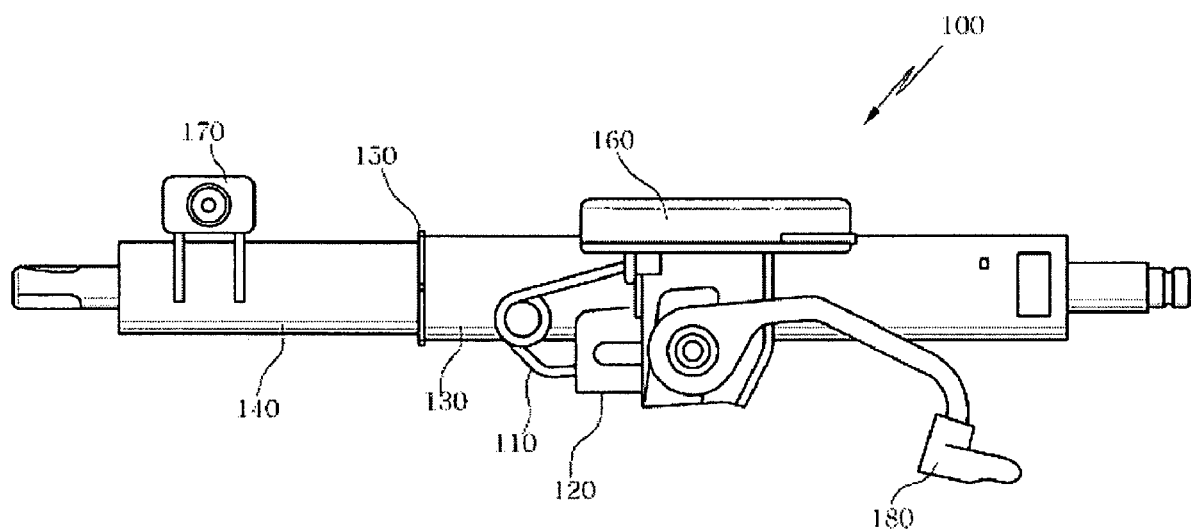
FIG. 1 is a perspective view of a conventional steering column.

Hereinafter, a preferred embodiment of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 2:
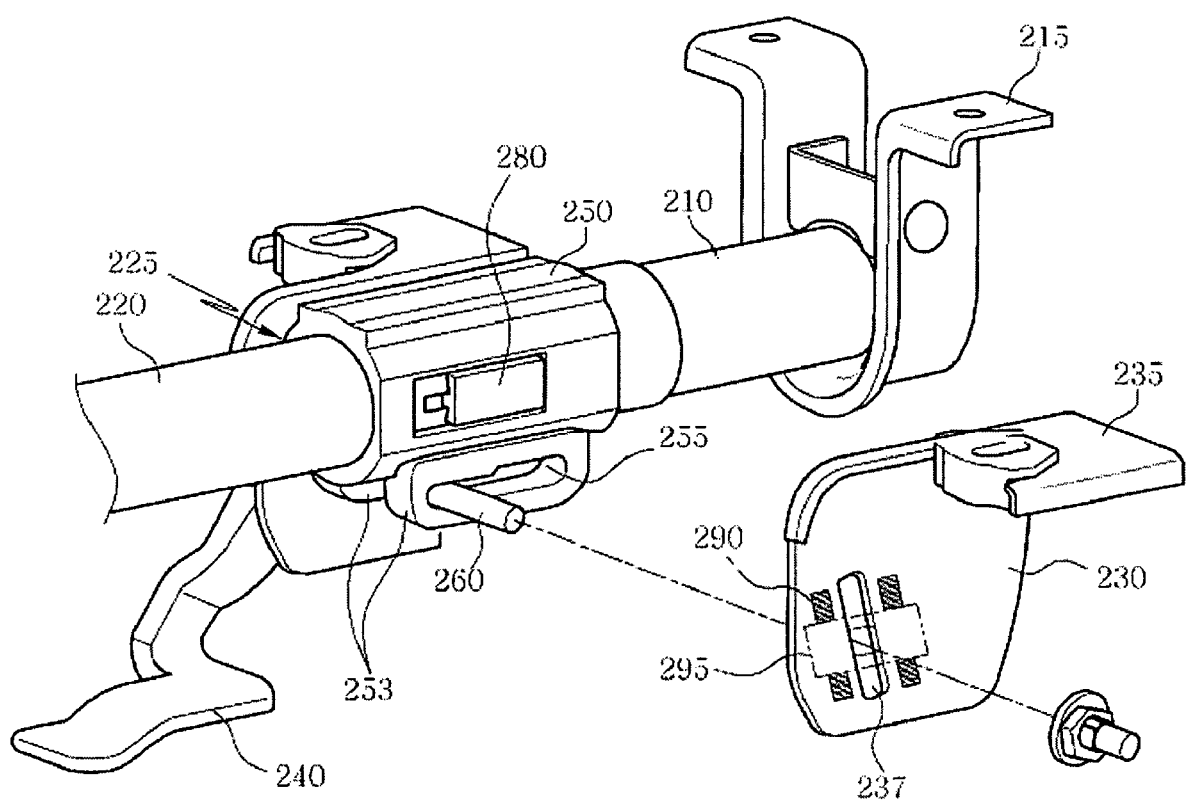
FIG. 2 is a perspective view of a tilt-and-telescopic system according to a preferred embodiment of the present invention.

FIG. 2 is a perspective view of a tilt-and-telescopic system according the preferred embodiment of the present invention.

The tilt-and-telescopic system according to the preferred embodiment of the present invention includes an interior tube 210, an exterior tube 220, tilt brackets 230, a lever 240, and a distance member 250. An end of the interior tube 210 is held in a vehicular body by a lower mounting bracket 215, and the other end thereof is inserted in an inner peripheral surface of the exterior tube 220.

The distance member 250 is integrally fixed in an outer peripheral surface of an end of the exterior tube 220 by welding, etc. A structure that the distance member 250 and the exterior tube 220 are integrally fixed in each other refers to an outer 225. As shown in the accompanying drawings, the distance member 250 has a pipe-configuration and includes guide parts 253 at opposite sides of a lower outer peripheral surface of the exterior tube 220. Each guide part 253 has a telescopic guide groove 255 formed therein.

Each tilt bracket 230 is fixed in the vehicular body integrally with an upper mounting bracket 235, and has a tilt guide groove 237 formed in both sides thereof while facing each other. The tilt bracket 230 is disposed on both left and right sides of the distance member 250, and the distance member 250 and each tilt bracket 230 are assembled with each other by a bolt 260 extending through telescopic guide grooves 255 and tilt guide grooves 237.

An end of the bolt 260 has a lever 240 for rotating the bolt 260, and the other end thereof has a fixed gear 290 and a movable gear 295 which are used for controlling a location of the steering wheel when a tilt function is performed. The structure configured as described above has a guide bush 280 for fixing the interior tube 210 in the exterior tube 220 when the lever is operated.

Figure 3A:
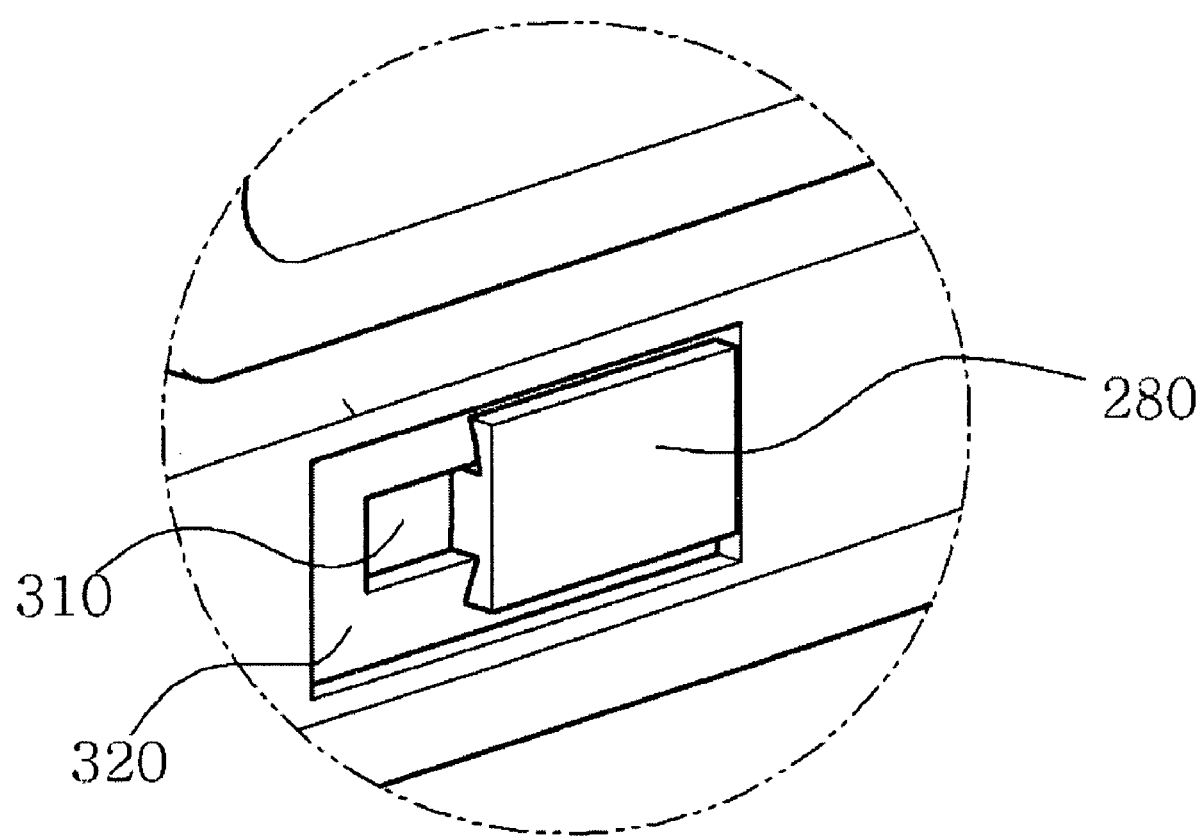
FIG. 3a is a partial perspective view of the tilt-and-telescopic system according to the preferred embodiment of the present invention.
Figure 3B:
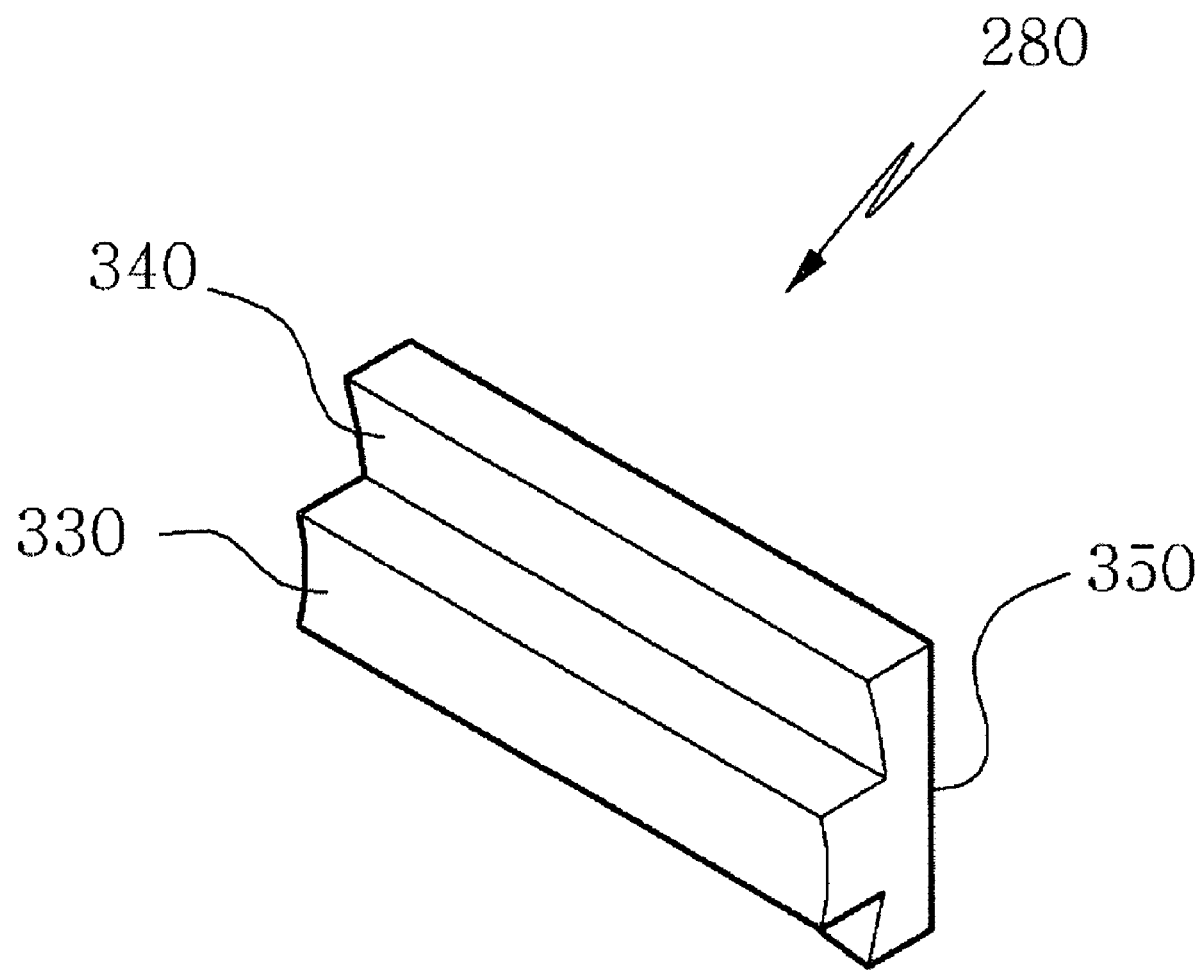
FIG. 3b is a perspective view of a guide bush according to the preferred embodiment of the present invention.

FIG. 3a is a partial perspective view of the tilt-and-telescopic system according to the preferred embodiment of the present invention. FIG. 3b is a perspective view of the guide bush according to the preferred embodiment of the present invention.

The outer 225 has a through hole 310 formed in both or one of a left side and a right side of the distance member 250, in which each tilt bracket 230 and the distance member 250 make contact with each other, so that it is easy to control load when the lever 240 is operated. The through hole 310 has a rectangular configuration having a sectional shape of "T". A central part of the through hole 310 in a vertical width direction thereof extends completely through the distance member 250. Also, the through hole 310 has a fixing groove 320, which is formed in upper and lower parts of the central part and has a predetermined depth. The guide bush 280 has a configuration having a sectional shape similar to "T", and includes a protruding part. The guide bush 280 has a first contact surface 330 formed at the protruding part of the guide bush 280 and a second contact surface 340 formed at a non-protruding part of the guide bush 280. It is preferable that the first contact surface 330 has a curvature equal to a curvature of the outer peripheral surface of the interior tube 210, and the second contact surface 340 has a curvature equal to a curvature of the fixing groove 320, so that the guide bush 280 can be tightly inserted in the through hole 310 and come into close contact with the outer peripheral surface of the inner tube 210. Also, the guide bush 280 has the third contact surface 350, which is a surface opposite to the surfaces having the protruding and non-protruding parts, having a flat shape so as to come into close contact with the tilt bracket 237.

Therefore, when the lever 240 is held, the bolt 260 is locked so as to apply a pressure to the tilt bracket 230, thereby applying the pressure to the guide bush 280. As a result, the guide bush 280 presses the interior tube 210 as well as the outer 225, so that the telescopic apparatus is fixed. At the same time, the fixed gear 290 is engaged with the movable gear 295, so as to fix the tilt apparatus.

As described above, according to the present invention, the through hole is formed in the exterior tube and the distance member, and the guide bush is inserted in the through hole, thereby providing a strong coupling force when the lever is held. Therefore, there is an effect to restrict idle vibration occurring during stopping of the vehicle.

Although a preferred embodiment of the present invention has been described for illustrative purposes, those skilled in the art will appreciate that various modifications, additions and substitutions are possible, without departing from the scope and spirit of the invention as disclosed in the accompanying claims. Accordingly, the scope of the invention is not to be limited by the above embodiments but by the claims and the equivalents thereof.

What is claimed is:

1. A tilt-and-telescopic steering system comprising:
   an interior tube and an exterior tube which surround a steering shaft;
   a distance member integrally fixed to an outer peripheral surface of the exterior tube;
   tilt brackets assembled with an outer peripheral surface of the distance member so as to limit a movement angle in tilt operation; and
   a lever and a bolt which hold and release the tilt-and-telescopic system,
   wherein a through hole is formed in the exterior tube and the distance member which are disposed between an outer peripheral surface of the interior tube and an inner peripheral surface of the tilt brackets, the through hole having a central part extending completely through the distance member and the exterior tube, and the through hole having a fixing groove formed in a predetermined depth so that the through hole has a sectional shape similar to a 'T' shape, and,
   wherein a guide bush is inserted in the through hole and has a configuration having a sectional shape similar to a 'T' shape.

2. The tilt-and-telescopic steering system as claimed in claim 1, wherein the through hole is formed on one or both sides of the distance member.

3. The tilt-and-telescopic steering system as claimed in claim 1, wherein the guide bush has a first contact surface formed at a protruding part of the guide bush and a second contact surface formed at a non-protruding part of the guide bush, the first contact surface and the second contact surface facing in a same direction, the first contact surface having a curvature equal to a curvature of the outer peripheral surface of the interior tube, the second contact surface having a curvature equal to a curvature of the fixing groove, so that the guide bush can be tightly inserted in the through hole and come into close contact with the outer peripheral surface of the inner tube.

4. The tilt-and-telescopic steering system as claimed in claim 1, comprising guide parts at opposite sides of a lower outer peripheral surface of the distance member, each guide part having telescopic guide groove.

* * * * *